(12) United States Patent
Kamangar et al.

(10) Patent No.: US 8,082,174 B1
(45) Date of Patent: Dec. 20, 2011

(54) ARBITRATING THE SALE OF AD SPOTS TO INCREASE OFFER COMPETITION

(75) Inventors: Salar Arta Kamangar, Palo Alto, CA (US); Alan Louie, Los Altos, CA (US); Nathan Stoll, San Francisco, CA (US); Susan Wojcicki, Mountain View, CA (US)

(73) Assignee: Google, Inc., Mountain View, CA (US)

( * ) Notice: Subject to any disclaimer, the term of this patent is extended or adjusted under 35 U.S.C. 154(b) by 1423 days.

(21) Appl. No.: 10/795,807

(22) Filed: Mar. 8, 2004

Related U.S. Application Data

(60) Provisional application No. 60/452,683, filed on Mar. 7, 2003.

(51) Int. Cl.
*G06Q 30/00* (2006.01)
(52) U.S. Cl. ...................................... 705/14.1
(58) Field of Classification Search ............ 705/14, 705/14.1
See application file for complete search history.

(56) References Cited

U.S. PATENT DOCUMENTS

| | | | | |
|---|---|---|---|---|
| 5,724,521 A | * | 3/1998 | Dedrick | 705/26 |
| 5,933,811 A | * | 8/1999 | Angles et al. | 705/14.56 |
| 6,324,519 B1 | * | 11/2001 | Eldering | 705/14 |
| 2002/0116313 A1 | * | 8/2002 | Detering | 705/37 |
| 2004/0103024 A1 | * | 5/2004 | Patel et al. | 705/14 |

* cited by examiner

*Primary Examiner* — Daniel Lastra
(74) *Attorney, Agent, or Firm* — John C. Pokotylo; Straub & Pokotylo

(57) ABSTRACT

Any content provider, such as a Website that generates pageviews, with available ad spots can sell such ad spots with fine granularity such as on a per pageview basis, or even on a per ad spot basis. One or more ad spots can be sold for the highest compensation for that pageview. These sales, such as via arbitrated offers, may be dynamic, because many pageviews are not determined until a user request is received, and because the winning ad provider(s) for a pageview might not selected until the page request is known. This may be done by (a) accepting ad spot availability information from a first party, (b) multicasting ad spot requests for offers using the accepted ad spot availability information to at least two second parties, (c) receiving offers, (d) determining at least one winning ad using the offers, and (e) providing information concerning at least one of the at least one winning ad to the first party. The compensation can be made fairer for the Website owner, even in cases where there is an information disparity. This may be done by using a dominant bidding strategy. Alternatively, or in addition, this may be done by having the party with the information advantage, which will normally be the ad network, make a priori guarantees with respect to compensation.

66 Claims, 10 Drawing Sheets

ARBITRATING THE SALE OF AD SPOTS TO INCREASE OFFER COMPETITION

§0. RELATED APPLICATIONS

This application claims the benefit of U.S. Provisional Application Ser. No. 60/452,683, entitled "DYNAMIC BIDDING," filed on Mar. 7, 2003 and listing Susan Wojcicki, Salar Arta Kamangar, Alan Louie, and Nathan Stoll as the inventors. That application is expressly incorporated herein by reference. The scope of the invention is not limited to any requirements of the specific embodiments in that application.

§1. BACKGROUND OF THE INVENTION

§1.1 Field of the Invention

The present invention concerns advertising. In particular, the present invention concerns on-line markets for matching ads of advertisers with available ad inventory of content providers.

§1.2 Background Information

Advertising using traditional media, such as television, radio, newspapers and magazines, is well known. Recently, advertising over more interactive media has become popular. For example, as the number of people using the Internet has exploded, advertisers have come to appreciate media and services offered over the Internet as a potentially powerful way to advertise.

Web page-based ads (also referred to as "Web ads") are often presented to their advertising audience in the form of "banner ads" (i.e., a rectangular box that includes graphic components). When a member of the advertising audience (referred to as a "viewer" or "user" in the Specification without loss of generality) selects one of these banner ads by clicking on it, embedded hypertext links typically direct the viewer to a page (which may be referred to as the "landing page" of the ad) of the advertiser's Website where they can be presented with marketing information and/or consummate a transaction. The process where the viewer selects an ad is commonly referred to as a "clickthrough" ("Clickthrough" is intended to cover any user selection.).

Advertisers compensate Website owners for the benefit of rendering their ad. Such compensation is often monetary. The amount of compensation may be determined on a per ad impression basis, a per ad selection basis, a per ad conversion basis, etc. The ways in which advertisers and Website owners agree on rendering ads and compensation vary. Some examples are provided below.

Sales Agreements

Referring to FIG. 1, Websites 110 with available spots 120 for advertisements ("ad inventory") often attempt to sell such ad inventory by entering into advertising contracts or agreements (referred to as "contracts" in the Specification without loss of generality) 140 with third parties 150. Generally, the more pageviews or content renderings (referred to as "pageviews" in the Specification without loss of generality) 130 the Website 110 generates, the more ad inventory 120 it will have available. The third parties 150 may be one or more advertisers 152. Alternatively, or in addition, the third parties 150 may be one or more advertising agencies (for example, entities such as 24/7 Real Media Inc. and DoubleClick) 154.

Although advertising contracts offer some level of certainty for both parties, they typically cover a long span of time and/or a large number of ad impressions delivered. If the advertiser could better spend its ad budget elsewhere, being stuck in such a long-term agreement is disadvantageous. Similarly, if the Website could receive more ad revenues from some other advertisers, being stuck in such a long-term agreement is disadvantageous. Although shortening the time span and/or number of ad impressions covered under the agreement might offer more flexibility to both parties, the overhead of renegotiating such agreements might be too high to make the frequent renegotiations inherent in short-term agreements worthwhile. Furthermore, smaller Websites might not have the resources to dedicate to negotiating ad sales agreements, let alone resources to find many competing advertisers.

Dynamically Executed Auctions

Some large Websites (e.g., Websites that generate a large number of pageviews) dynamically auction ad spots to competing advertisers. For example, the Google Website auctions ad spots on its search results pages (for example, under its "AdWords" program). Google also allows advertisers to compete for ad spots on (e.g., page views of) content provider Websites (for example, under its "AdSense" program). Note that a "search provider" may also be considered to be a content provider. Such techniques, when executed well, are beneficial to both the Website and the advertisers, and even the end users as well. In the following, an entity through which different advertisers (and often many different advertisers) can purchase ad spots may be referred to as "an advertiser network," or more briefly, an "ad network."

Unfortunately, many Websites do not have the resources to commit to running such auctions for ad spots on its pageviews, and would have to incur large costs to maintain a sales relationship with many advertisers. Moreover, an ad marketplace having many Websites with many ad spots, and many advertisers, could be very fragmented. An "ad network" may be used to review, target, budget, schedule, serve, bill, and audit ads from a collection of advertisers in its network. However, building an "ad network" which efficiently manages such a fragmented market, which may include hundreds of thousands of advertisers, is a costly undertaking. Considering that different Websites might sell their ad spots under different terms and conditions, and different advertisers might want to by ad spots under different terms and conditions, such a fragmented market would be too complex for many Websites and advertisers to fully exploit.

Sales Agreements with Ad Networks Dynamically Executing Auctions

Referring to FIG. 2, Websites 210 with available spots 220 that do not want to sell their ad spots directly, and that do not want run their own auctions, may attempt to sell such ad inventory by entering into contracts 240 with an ad network 254a. This market is often referred to as "sponsored links" advertising. For example, an ad network (such as Google) may enter into an agreement with a Website owner ("syndication partner") that allows the ad network to deliver ads to be shown on the syndication partner's ad spots. Unfortunately, like direct sales agreements, these contracts are typically for a long span of time and/or a large number of ad impressions. As was the case with direct sales contracts, such contracts may not be the most efficient means of selling ad inventory for Website owners because they have committed to receiving ads from a contractual partner, at a (often predetermined) contractual price.

A Website 210 may try to "hedge its bets" by entering into additional agreements 240b with additional ad networks 254b. For example, the Website 210 may sell ad spots 220 on some pageviews 230 to one ad network 254a, and other ad spots 220 on the same or other pageviews 230 to another ad network 254b. However, such parsing of pageviews and/or ad spots for sale to different ad networks will not necessarily provide the Website owner 210 with the best compensation. For example, pageviews or ad spots sold to one particular ad network many have earned more compensation if they were sold to another ad network.

Thus, it would be useful to help Websites to get better compensation for their ad spots.

§2. SUMMARY OF THE INVENTION

The present invention may be used to allow any Website or Web service (referred to collectively as "Websites") with available ad spots to have the opportunity to sell such ad spots with fine granularity such as on a per pageview basis, or even on a per ad spot basis. In at least one embodiment consistent with the present invention, Websites can sell one or more ad spots for the highest compensation for that pageview. These sales, such as via arbitrated offers (e.g., auctioned bids), may be dynamic, because many pageviews are not determined until a user request is received, and because the winning ad-provider(s) for a pageview might not selected until the page request is known. The present invention may do so by (a) accepting ad spot availability information from a first party, (b) multicasting ad spot requests for offers using the accepted ad spot availability information to at least two second parties, (c) receiving offers, (d) determining at least one winning ad using the offers, and (e) providing information concerning at least one of the at least one winning ad to the first party. In at least one embodiment of the present invention, if there is more than one winning ad determined, an order of such ads may be determined.

In at least some embodiments consistent with the present invention, the compensation can be made fairer for the Website owner, even in cases where there is an information disparity. The present invention may do so by using a dominant bidding strategy. Alternatively, or in addition, the present invention may do so by having the party with the information advantage, which will normally be the ad network, make a priori guarantees with respect to compensation.

§3. BRIEF DESCRIPTION OF THE DRAWINGS

§4. DETAILED DESCRIPTION

The present invention may involve novel methods, apparatus, message formats and/or data structures for helping Websites to get the best compensation for their ad spots, and/or for helping advertisers get the best deals for ad spots. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

In the following, environments in which, or with which, the present invention may operate are described in §4.1. Then, exemplary embodiments of the present invention are described in §4.2. Examples of operations are provided in §4.3. Finally, some conclusions regarding the present invention are set forth in §4.4.

Figure 1:
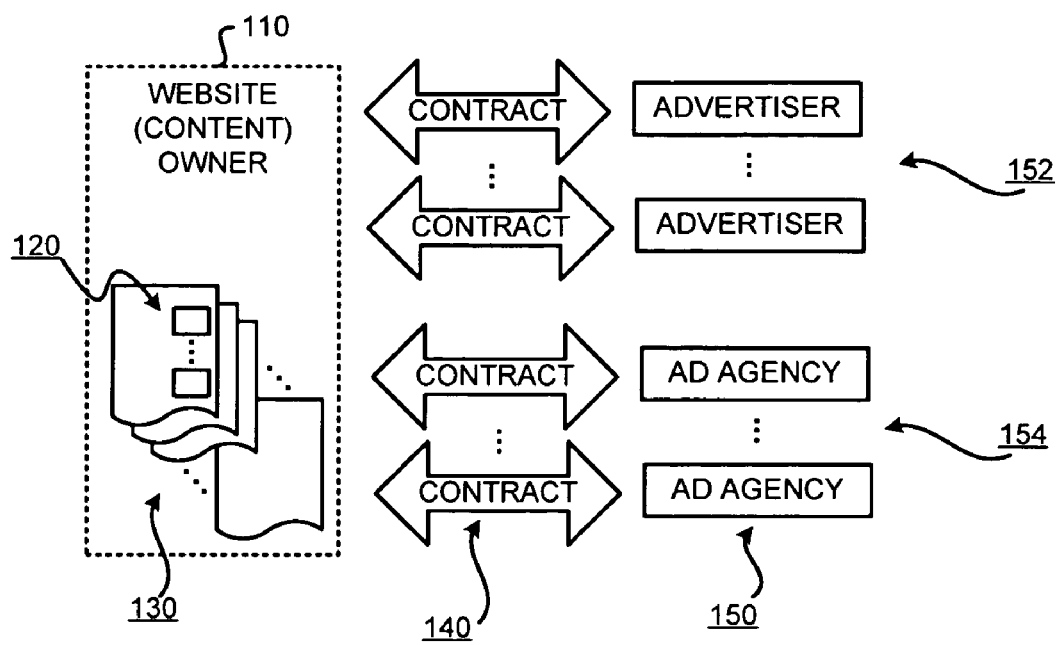
FIG. 1 is a block diagram illustrating parties that may participate in an on-line advertising market.
Figure 2:
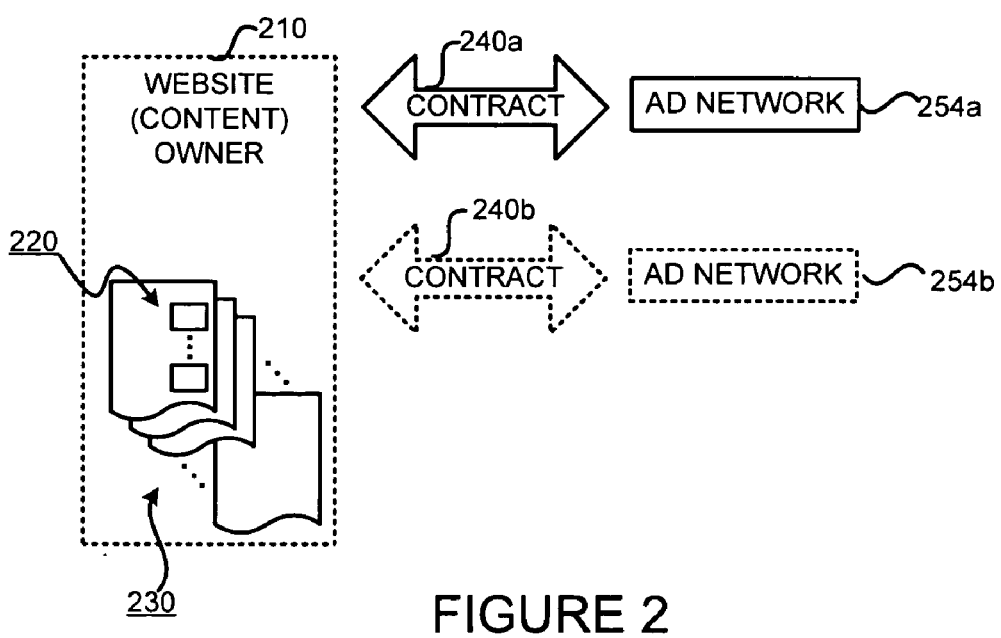
FIG. 2 is a block diagram illustrating parties that may participate in an on-line advertising market
Figure 3:
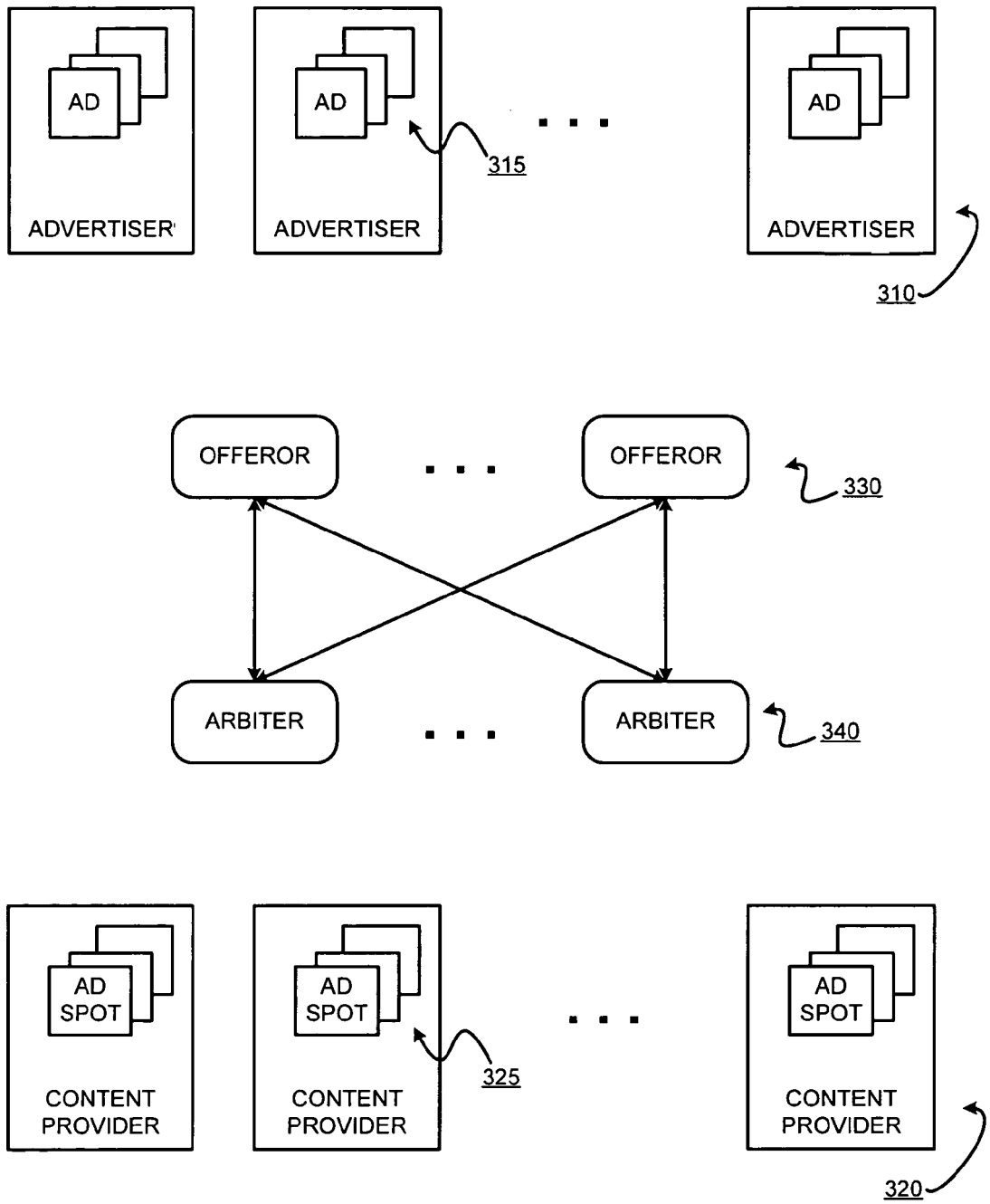
FIG. 3 illustrates exemplary environments in which the present invention may be used.

§4.1 Environments in which, or with which, the Present Invention May Operate FIG. 3 illustrates exemplary environments in which the present invention may be used. The components may able to communicate with one another, such as via a network or inter-network (not shown) for example. Each of one or more advertisers 310 has one or more ads 315 they would like to present. Each of one or more content providers 320 have a number of pageviews, each of which may have one or more ad spots 325 available for placement of an ad. Available ad spots 325 are also referred to as "inventory".

As can be appreciated from the foregoing, advertisers 310 want to purchase available ad spots 325 for their ads 315, and content providers 320 want to sell their inventory. Each party may desire to parse or bundle their purchases or sales in a particular way. For example, a content provider 320 may want to sell, or an advertiser 310 may want to buy, ad spots 325 on an per pageview basis, per page basis, per ad position per page, per pageview on Fridays, per pageview sent to Canada, per user location, etc., or any combinations of the above (e.g. the first and second ad placement positions on the first 10,000 pageviews returned from a query for "memorial day sale" on Friday May 23, 2003 between 10 am and 3 pm, user's local time), etc. Ad inventory can be sold as it becomes available. Alternatively, or in addition, anticipated or expected ad inventory (e.g., based on historical content serving/rendering) can be sold.

The purchase and sale of the ad spot inventory may take place by arbitrating among presented offers, as in an auction. An ad spot, or some bundle of ad spots may be offered for sale, one or more offerors 330 (e.g., advertisers) may submit offers, and an arbiter 340 may select one or more winning offers. The offers 330 and arbiters 340 can fall under any one of the following four scenarios for example.

Advertiser acts as its own offeror and a proxy acts as an arbiter for one or more content providers.

Advertiser acts as its own offeror and a content provider acts as its own arbiter.

A proxy acts as an offeror for one or more advertisers and a proxy acts as an arbiter for one or more content providers.

A proxy acts as an offeror for one or more advertisers and a content provider acts as its own arbiter.

Other scenarios are possible. For example, in a given arbitration, each of one or more advertisers may act as its own offeror, while each of one or more other advertisers may use a proxy to make an offer.

An exemplary system may define the following:

What is to be included in an offer and how offers are to be presented (offer rules);

How is a winner determined (offer arbitration); and

How much compensation does a winning party provide and how is compensation provided (e.g., pricing and payment determination).

Each of these aspects is described in §4.2 below.

§4.1.1 Definitions

Online ads may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad was served, a search query or search results associated with the serving of the ad, a user characteristic (e.g., their geographic location, the language used by the user, the type of browser used, previous pageviews, previous behavior), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered) is referred to as the "conversion rate." If a conversion is defined to be able to occur within a predetermined time since the serving of an ad, one possible definition of the conversion rate might only consider ads that have been served more than the predetermined time in the past.

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

Various exemplary embodiments of the present invention are now described in §4.2.

§4.2 Exemplary Embodiments

Figure 4:
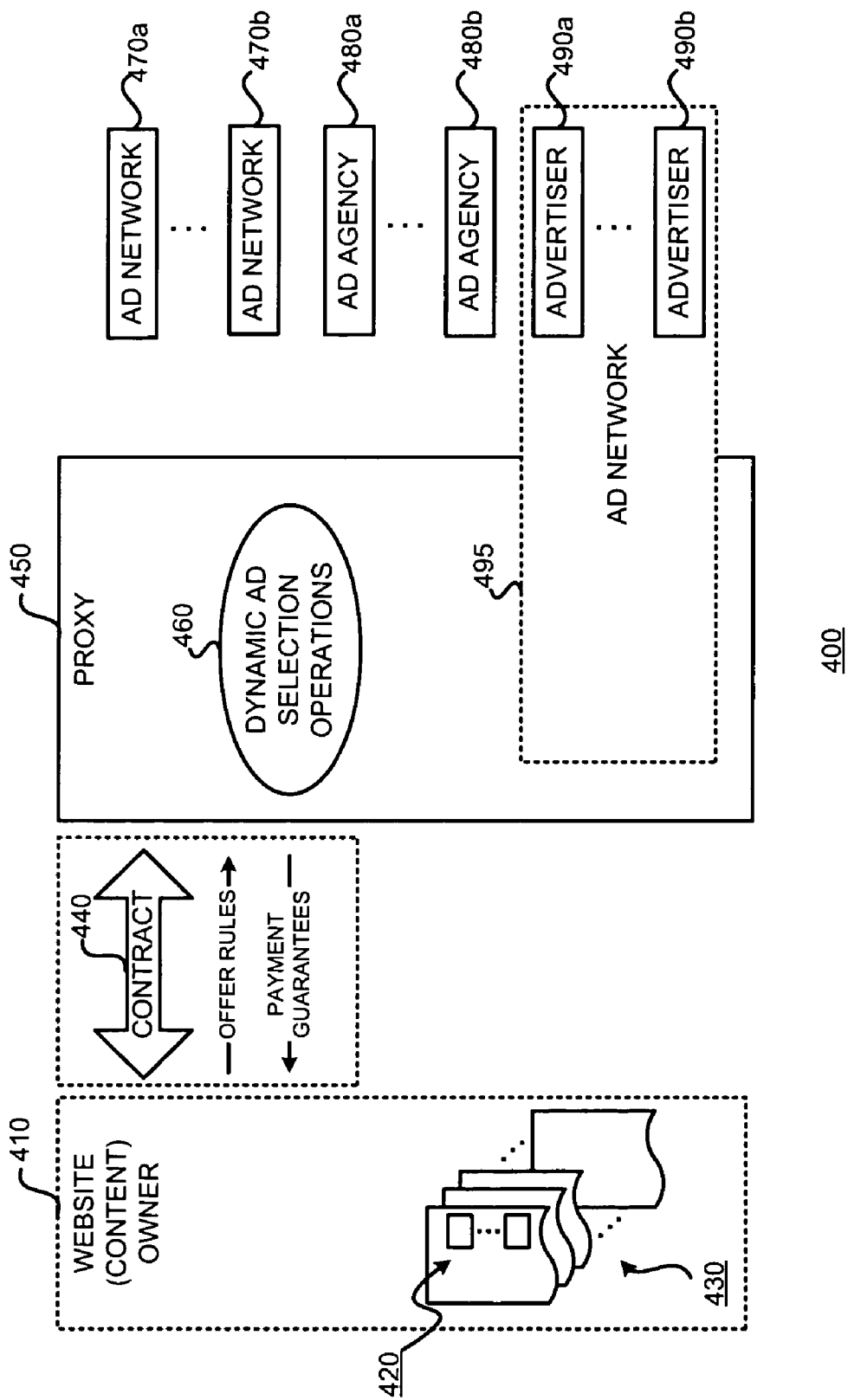
FIG. 4 is a diagram of a system in which the present invention may be used.

The present invention may be used to help Website (e.g.; content) owners with available ad spots to get the best compensation for those available ad spots. FIG. 4 is a diagram of a system 400, including one or more Website owners 410 (only one shown to simplify the drawing and explanation) and one or more ad networks 470, ad agencies 480, and/or advertisers 490. The Website owner 410 may generate pageviews 430 which may have ad spots 420. The one or more ad networks 470, ad agencies 480, and/or advertisers 490 may desire to have their ads placed on certain of the ad spots 420. Components of the system 400 may exchange information using one or more networks (not shown), such as the Internet for example.

A proxy 450 may have an agreement or contract 440 with the Website owner 410 to provide ads for its 410 ad spots 420. In some embodiments, the agreement 440 may include offer rules, such as rules specifying the content of offers, the timeliness of offers, etc. In some embodiments, the agreement 440 may include payment guarantees by the proxy 450 to the Website owner 410. The proxy 450 may include dynamic ad selection operations 460 for selecting ads for ad spots 420. Note that the proxy 450 may be an ad network 495 representing a number of advertisers 490, although this is not necessary.

Figure 5:
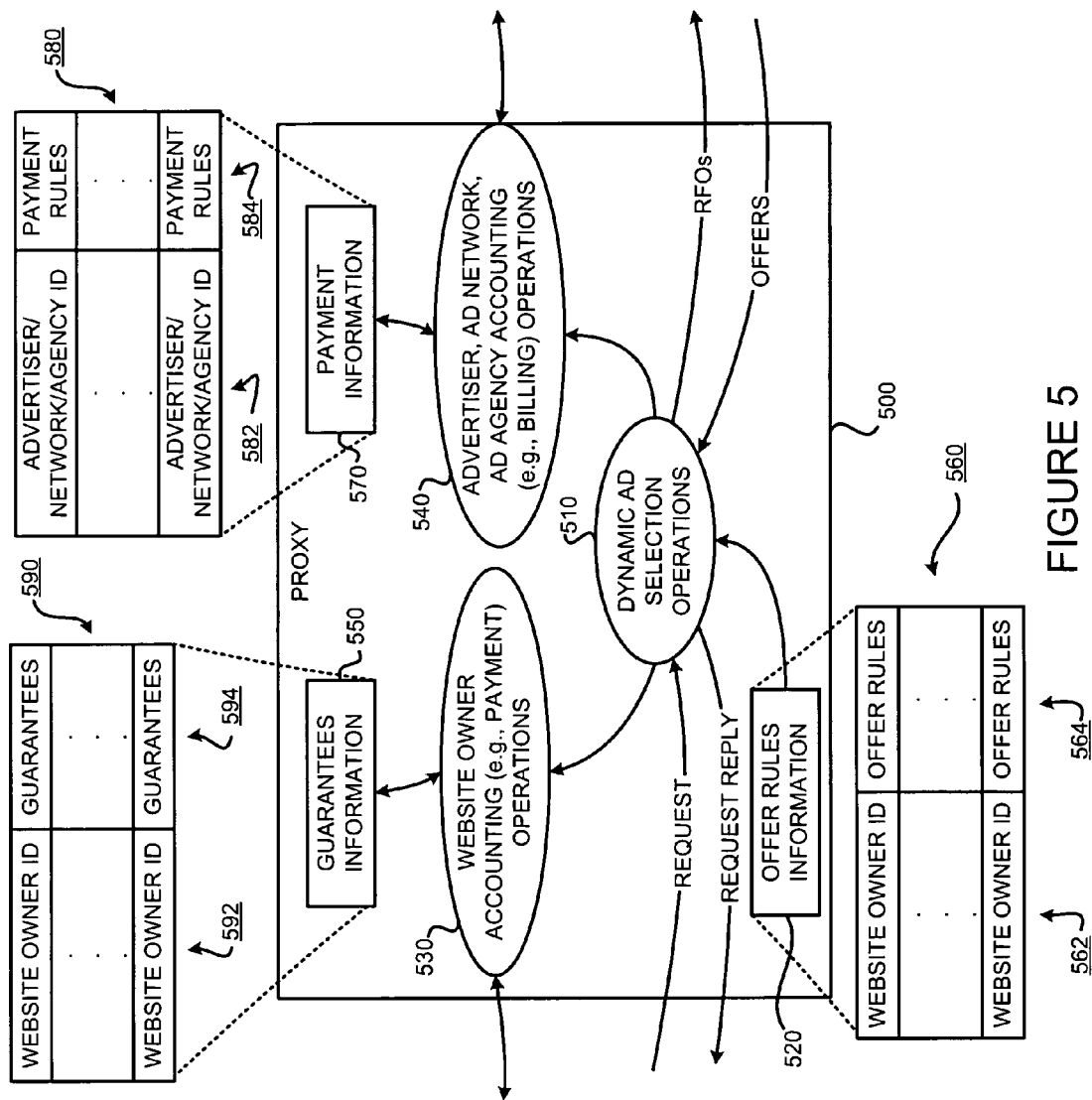
FIG. 5 is a bubble diagram of operations that may be used by an exemplary proxy that is consistent with the present invention, as well as information that may be generated and/or used to the exemplary proxy.

FIG. 5 is a bubble diagram of operations that may be performed by an exemplary proxy 500, as well as information that may be generated and/or used to the exemplary proxy 500. The proxy 500 may include dynamic ad selection operations 510 that may (i) accept requests for ads, (ii) broadcast or multicast requests for offers (RFOs), (iii) accept offers, (iv) determine one or more winning ads for the request, and (v) provide an ad request reply. The dynamic ad selection operations 510 may use offer rules information 520. Such information 520 may be used (i) when generating requests for offers, and/or (ii) when selecting ad offers.

In an exemplary data structure 560, offer rules information 520 may include one or more entries, each including a Website owner identifier 562 and offer rules 564. The Website owner identifier 562 may be used as a key to lookup offer rules 564. The Website owner identifier 562 may be a URL of the home page of the Website, or some other unique identifier.

Many types of offers are possible. As one example, offers could be completely variable. In this case, each party decides what value information and payment promise they want to make, and the Website owner (or other content provider) can chose among different values and different payment schemes. That is, the content provider selling ad spots can arbitrate offers of potentially varying forms. This may be thought of as "unstructured bidding." As another example, rules for offers can be defined by Website owners. In this case, all offers could be forced to conform to the same pricing scheme for a Website owner, either defined in offer rules, or contractually upon joining the bidding process. This can be though of as "intra-site standardized bidding". As yet another example, offers could be standard across all Websites. In this case, if there was one system in place used by all Website owners, all offers could be forced to conform to the same rules across all Websites. This can be thought of as "standardized offer rules".

In one environment, each Website owner can be thought of as a single offer arbitration (e.g., auction) event, with many items (ad-spots, pageviews, some bundle of ad spots, etc.) for sale. Each arbitration could have its own rules, or all arbitrations could all be the same. There could be one auction house, or many.

The content of an offer can be wide ranging, depending on what an advertiser or proxy for multiple advertisers (referred to as an "ad-network") wants to provide (or can provide), and depending on what the Website owner wants to know. Accordingly, an offer may include one or more of the following: (i) expected revenue for each available ad impression (e.g., given some serving parameter such as the position of the ad on the Web page); (ii) expected revenue for the whole pageview (e.g., given the number of ad spots available, their positions, etc.); (iii) one or more historical performance parameter(s) (e.g., click-through rate, conversion rate, dwell time, etc.) for the ad; (iv) one or more expected performance parameter(s) (e.g., click-through rate, conversion rate, dwell time, etc.) for the ad on the space for sale; and (v) one or more expected performance parameter(s) (e.g., click-through rate, conversion rate, dwell time, etc.) for the ad in general.

If a Website owner wants to share revenue with the proxy 450/500 based on the revenue the proxy actually receives from advertisers for displaying an ad on a pageview of the Website owner, they are likely to want to know the expected revenue for an ad or a page, because that is the information most relevant in deciding which ad is most valuable in such a scheme.

Potential offers (an "offer" is a "potential offer" that is actually submitted) may include conditions or constraints that must be met before an offer is made. For example, an advertiser may specify that a potential offer is only to be submitted or considered for ad spots that satisfy certain targeting criteria (e.g., ad spots) on certain content, a certain type of content, a search result page returned in response to a query including certain keywords, certain content serving/rendering instance conditions (e.g., first N pageviews of article X occurring on a Friday, for a request from state Z), certain temporal conditions, certain geo-location conditions, certain requestor user types, certain requestor user behaviors, etc.). A potential offer may also specify an ad spot parameter as a condition (e.g., top spot, ad of a certain size, ad appearing with no other ads, etc.).

Some exemplary offer rules 564 may include information such as timeliness rules, syntax rules, compensation rules, credit rules, content restrictions rules (no bad words, blocked subjects (e.g., no pharmaceuticals), currency conversion rules (e.g., no intermediate conversions), rules as to whether ads may contain images, multimedia, text-only, etc., a minimum performance quality threshold (e.g., as determined by historical clickthrough rate information), quality, reputation, or stability of advertiser, risk assumption (e.g., indemnification), etc. For example, a first Website owner might specify that the offer must be made immediately, must be in an amount of U.S. dollars, must be cost per selection, subject to a minimum cost (e.g., for the impression), and the offer must be backed by some acceptable guarantee of payment. Another Website owner might specify that the offer must be made immediately, must be in an amount of E.U. Euros, and must be a cost per impression. Ways in which the dynamic ad selection operations 510 may use offer rule information 520 are described later.

As shown in FIG. 5, the dynamic ad selection operations 510 may interact with Website owner accounting operations 530 and advertiser, ad network, ad agency accounting operations 540. More specifically, the advertiser/ad network/ad agency accounting operations 540 may be used to bill such parties for their ads that were served. Such operations 540 may use payment information 570. The Website owner accounting operations 530 may be used to compensate the Website owner for ads placed on ad spots of their pageviews. Such operations 530 may use guarantees information 550.

Advertiser/ad network/ad agency accounting operations 540 may be used to charge advertisers/ad networks/ad agencies for serving their ads. In an exemplary data structure 580, the payment information 570 may include one or more entries, each including an advertiser/ad network/ad agency identifier 582 and payment rules 584. The identifier 582 may be used as a key to look up payment rules 584. Charges may be determined in one or more of a number of ways, including cost per impression, cost per selection, cost per conversion, discounted cost per impression, discounted cost per selection, discounted cost per conversion, etc. Such information may be expressed as one or more payment rules 584.

In an exemplary data structure 590, the guarantees information 530 may include one or more entries, each including a Website owner identifier 592 and guarantees 594. The Website owner identifier 592 may be used as a key to lookup guarantees 594. The Website owner identifier 592 may be a URL of the home page of the Website, or some other unique identifier. Some exemplary guarantees 594 may include a minimum payment per time period, a minimum payment per a predetermined number of impressions, a revenue or earnings sharing percentage, a guarantee which combines two or more guarantees, etc. For example, the proxy 500 may guarantee a first Website owner a payment of the larger of (A) $50.00 per thousand impressions, and (B) 50% of the proxy's earnings for ads served on the Website owner's ad spots. Ways in which the Website owner accounting operations 530 may use guarantees information 550 are described later.

It is likely that large Website owners (public companies) would like guarantees from participants, such as guarantees specifying a total minimum offer sum (e.g., per time period), for example. However, if participants are going to make revenue guarantees, they will likely want guarantees about how winners will be determined in the auction system. For example, there might need to be a contractual assertion that the highest CPM offeror would be selected. One situation that should be avoided is 'acceptance spam'. That is, the Website owner should not be able to select a winner, tell them they showed their ads, and then actually show ads from another participant. Accountability mechanisms may be used to avoid this. Similarly, if the offer arbiter specifies a particular arbitration procedure, it should be ensured that the offer arbiter in fact uses the specified procedure.

Designing the particulars of the auction and payment scheme is challenging, especially because of cases where there are only a few (e.g., two) competing parties.

A Website, which might have no ad network of its own, likely has no idea what the worth of an ad is on a particular Web page. If it had some such knowledge, it could set reserve prices, and try to avoid collusion among the competing offerors, or potential offerors. However, Websites often do not have such knowledge.

The offerors may be intermediaries, such as ad networks or ad agencies or proxies for example, that know what advertisers are willing to pay them for a particular result (e.g., a single click, or a particular conversion), and may have information (e.g., per query) about historical clickthrough rates, historical conversion rates, and the advertisers' desired maximum price per result (e.g., per selection or per ad impression). Thus, offer aggregators such as ad networks may know how much the ad impression is worth to them in revenue, regardless of their ad pricing model. For example, in a Cost-Per-Impression pricing model, the value of an impression may be considered to be revenue per impression. In a Cost-Per-Selection pricing model, the value of an impression may be considered to be (likelihood of selection)*(estimated revenue from selection). In a Cost-Per-Conversion pricing model, the value of an impression may be considered to be (likelihood of selection)* (likelihood of conversion)*(estimated revenue from conversion).

Referring back to FIG. 3, in a scenario under which a proxy acts as an offer aggregator for one or more advertiser and a content provider acts as its own arbiter, the parties may have unequal information. That is, the offer aggregator may know (or at least have a good estimate of) the true valuation of the placing an ad on the available ad spot (from their own network of advertisers), whereas the Website owner might not know this (unless the Website owner also has an ad network).

In an auction with more than two offerors, the pricing system should be designed to encourage truthful offers. Typically, this means that there should be a dominant offering strategy (the optimal offer for any one participant should not depend on the offer of any other participant) that maximizes revenue and efficiency for the property owner auctioning available ad spots. Such offer independence avoids collusion. This can be achieved in several ways.

First, this can be achieved by using various market-price discounting mechanisms, such as paying only slightly more than the next highest bidder (See e.g., U.S. patent application Ser. No. 10/340,543, entitled "Automated Price Maintenance For Use With A System In Which Advertisements Are Rendered With Relative Preferences", filed on Jan. 10, 2003, listing Eric Veach and Salar Arta Kamangar as inventors, and U.S. patent application Ser. No. 10/340,542, entitled "Automated Price Maintenance For Use With A System In Which Advertisements Are Rendered With Relative Preference Based On Performance Information And Price Information", filed on Jan. 10, 2003, listing Eric Veach and Salar Arta Kamangar as inventors (both of these applications are incorporated herein by reference), or paying based on the value of the property if one's offer is removed from the calculation, for example).

Second, this can be done by requiring each offeror to make a priori guarantees to the Website owner about the sum of their bids. Payment may then actually be based on a fixed percent (e.g., 90%) revenue sharing on the ad revenue that the offeror derives. Then, if the offeror games by overbidding, it would be liable to pay at least the sum of all the bids they win. If the offeror underbids, they would be liable for the a priori guarantee (e.g., a percentage of the revenue). In this case, a proxy may act as a market maker.

One problem with a sum-based offer guarantee is that it allows marginal gaming based on the distribution of high-value ad spots (e.g., spots on search result pages returned in response to queries including certain keywords—referred to simply as "queries"), and the distribution of monetization capability. For example, if an offeror such as an ad network knows that it is only liable for the sum of the offers it wins, it can overbid on queries that it knows its competitors closely matches its abilities on, and underbid on queries that it knows its competitors have weak ability on. The sum of the offeror's guarantees would be close to the revenue it would expect, but it might have won on queries that one or its competitors could have monetized better. Thus, if the offeror can exploit its advantage in one, less competitive, area to subsidize winning in another, more competitive, area, the Website owner would not achieve maximal revenue.

One solution to this problem is to not calculate payments based on the sum of guarantees and the sum of revenue, but to actually do a per-ad spot (e.g., per-query, per-pageview, etc.) payment calculation. If an offeror offers a dollar, that is its guarantee for that query—it either pays the dollar or some predetermined amount (e.g., 90%) of the revenue it actually made. The issue is that in this model, the offeror would no longer want to offer their expected revenue for a query.

In such an embodiment, each partner would be able to "offer" whatever they wanted per query, and whoever wins the offer would pay the greater of a predetermined guarantee (e.g., an amount (e.g., 90%) of the revenue actually collected), or the offer.

Thus, the present invention permits a dynamic bidding model, consistent with the present invention, in which gaming consequences for various pricing variations are accounted for.

§4.2.1 Exemplary Methods

Regardless of the party that handles the offering and arbitration, a process of dynamic ad selection may include the following:

Website or web service owner (or any content provider) (or a proxy) sends information to the potential offerors about the pageview (or other content) that has ad spot inventory (e.g., query keywords, URL/html).

Ad-providers (or a proxy) send back their respective offers.

The Website/service owner (or a proxy) picks the winning offer(s).

The winning offeror (or a proxy) sends back the ad content (if it hasn't already provided it) to be included in, or otherwise associated with the content (e.g., displayed in a Web page).

The ad content is included in, or otherwise associated with, the content.

Figure 6:
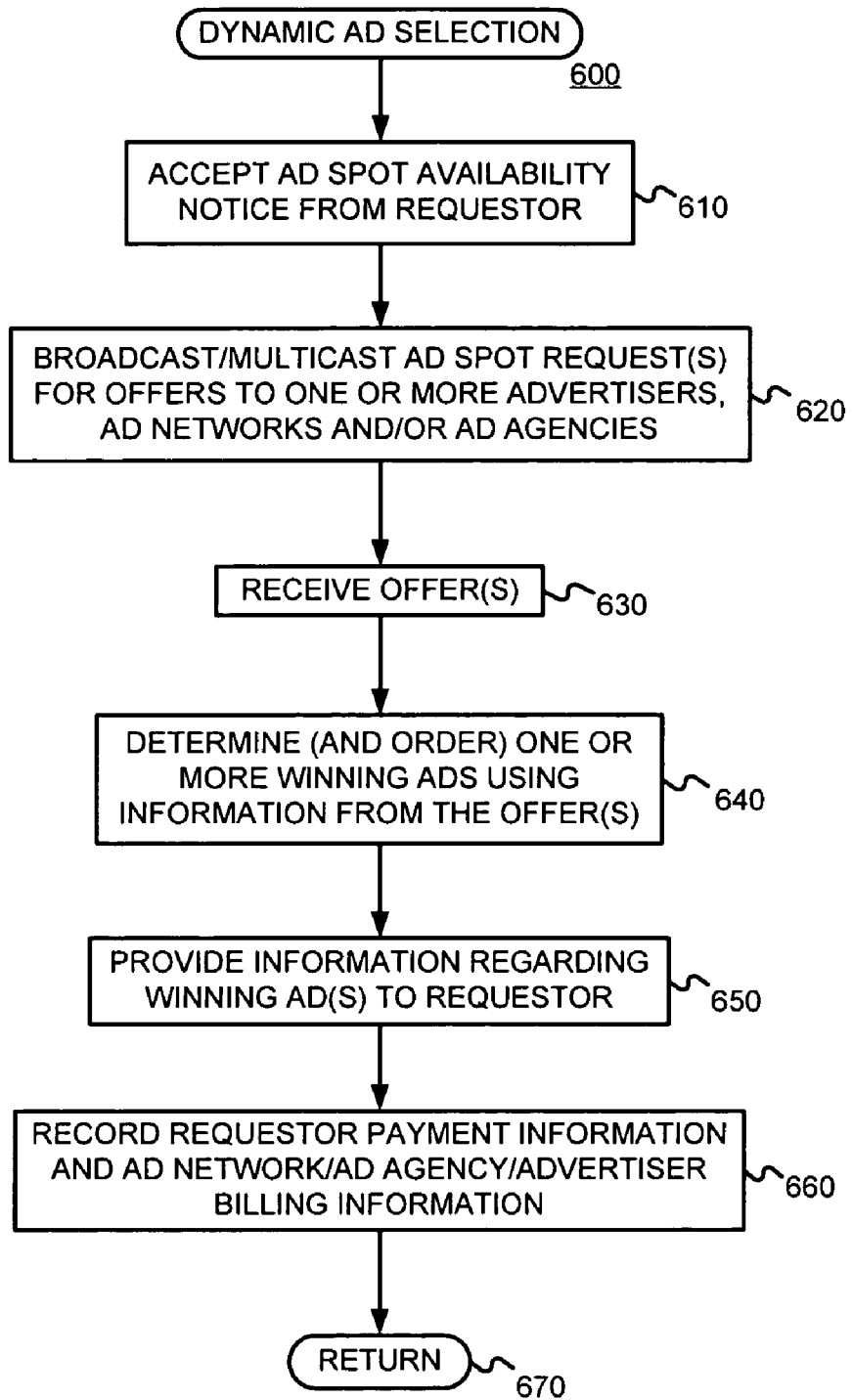
FIG. 6 is a flow diagram of an exemplary method that may be used to select ads dynamically, in a manner consistent with the present invention.

FIG. 6 is a flow diagram of an exemplary method 600 that may be used to select ads dynamically, in a manner consistent with the present invention. An ad spot availability notice (also referred to as a "request" or an "ad request") is accepted from a requestor. (Block 610) Ad spot request(s) for offers are then sent (e.g., broadcast, multicast) to one or more advertisers, ad networks, ad agencies, etc. (Block 620) One or more offers are then received. (Block 630) One or more winning ads may then be determined and/or ordered using at least the received offers. (Block 640) Information regarding the winning ad(s) is then provided to the requestor that initiated the ad request. (Block 650) Finally, requestor payment information and/or ad network/ad agency/advertiser billing information may be recorded (Block 660) before the method 600 is left (Node 670).

Referring back to block 610, the ad request may include rules for offers, or a key to previously stored rules for offers. Alternatively, or in addition, the ad request may include pageview information such as the content of the pageview, topics, concepts or categories of the content of the pageview, keywords associated with the pageview, information about the user that requested the pageview, local time information, geo-location information, etc.

Referring back to block 620, a request for offers may include some or all of the offer rules. In some embodiments, a request for offers might not include any offer rules. In some embodiments, a request for offers might include pageview information such as content of the pageview associated with the ad spot, topics, concepts or categories of the content of the pageview associated with the ad spot, keywords associated with the pageview associated with the ad spot, information about the user that requested the pageview, local time information, geo-location information, etc.

Note that blocks 620 and 630 need not be performed if all offers are standing offers. For example, an advertiser, ad network, and/or ad agency may have standing offers made before the pageview with ad spots becomes available.

Referring back to block 640, the determination of winning ads can be done such that the offer rules are complied with. For example, in such an embodiment, if an offer rule is that the offer is a dollar amount to be paid per impression, the offer must include a dollar amount to be paid for an impression. However, in some embodiments of the proxy, strict offer rule compliance is not necessary. For example, the proxy may convert an offer of a first type (e.g., a price per selection offer) to an offer of a second type (e.g., a price per impression offer). Thus, the proxy may act as a market translator and "bridge the gap" between offer rules and an actual offer. The proxy may assume the potential risk of loss, and assume the potential benefit of gain.

Referring back to block 650, the information regarding the winning ad(s) may include the ad(s) itself, or a key(s) to lookup (e.g., a unique location(s) of) the ad(s).

§4.2.2 Refinements and Alternatives

A proxy can forward requests for offers (RFOs) to all ad networks/ad agencies/advertisers, or to a subset (e.g., based on rules and/or knowledge about) of ad networks/ad agencies/advertisers. For example, if the ad request specifies a text only ad, the proxy might only forward RFOs to those that want to place text only ads. As another example, if the ad request specifies that the offer must be a price per conversion, the proxy might only forward RFOs to those that want to make price per conversion offers. (However, as noted above, the proxy can act as a market translator to "bridge the gap" between offers that don't comply with one or more offer rules.)

Dynamic bidding may also be offered to advertisers, not just content owners or Website owners. Thus, for example, an advertiser can come to a proxy to have its ad served on a number of Websites (e.g., content providers, or search engines such as Google, Overture, FindWhat, etc.) on a best value to the advertiser basis. As a more concrete example, an advertiser with a large ad budget, such as IBM, Budweiser, or Honda for example, may have Website owners compete with one another for its business. In this case, the advertiser might submit a request, a proxy (e.g., a content owner network) might multicast the request to various content owners, and the content owners might send back offers. The proxy may then select the content (e.g., pageviews) on which the advertiser's ads will be shown.

Although the present invention was described with reference to Website Owners having Web Pages with available ad spots, the present invention is not limited to such an application. For example, it can be used with any content provider having content with available ad spots. The content may be of any form and may be rendered in one or more ways (e.g., displayed text, images and/or video, played audio, etc.).

Although the proxy was shown as an intermediate entity arranged between parties seeking to sell ad spots and parties seeking to place ads, any one of an advertiser, an ad network, an ad agency, a content provider, or a content provider network may perform the operations performed by the proxy. Indeed, in some of the exemplary embodiments described above, it was noted that the proxy might serve as an ad network.

As discussed above, the proxy can enforce strict compliance of offer rules to offers. Alternatively, the proxy may have information or estimates to enable it to bridge the gap between at least some non-compliant offers and offer rules. In such an alternative, the proxy may act as a market translator. In either case, the proxy may act as a market maker, and take a fixed percentage of each transaction, or profits of each transaction. Alternatively, the proxy may act as an arbitrageur profiting from any spread between what an advertiser is willing to provide as compensation (e.g., pay) and what a content owner is willing to accept as compensation. When acting as an arbitrageur, the proxy may use certain information (as in the case where payment is per impression), or rely on estimates (as in the case where payment is contingent upon some event, such as a selection or conversion for example).

§4.2.3 Exemplary Apparatus

Figure 7:
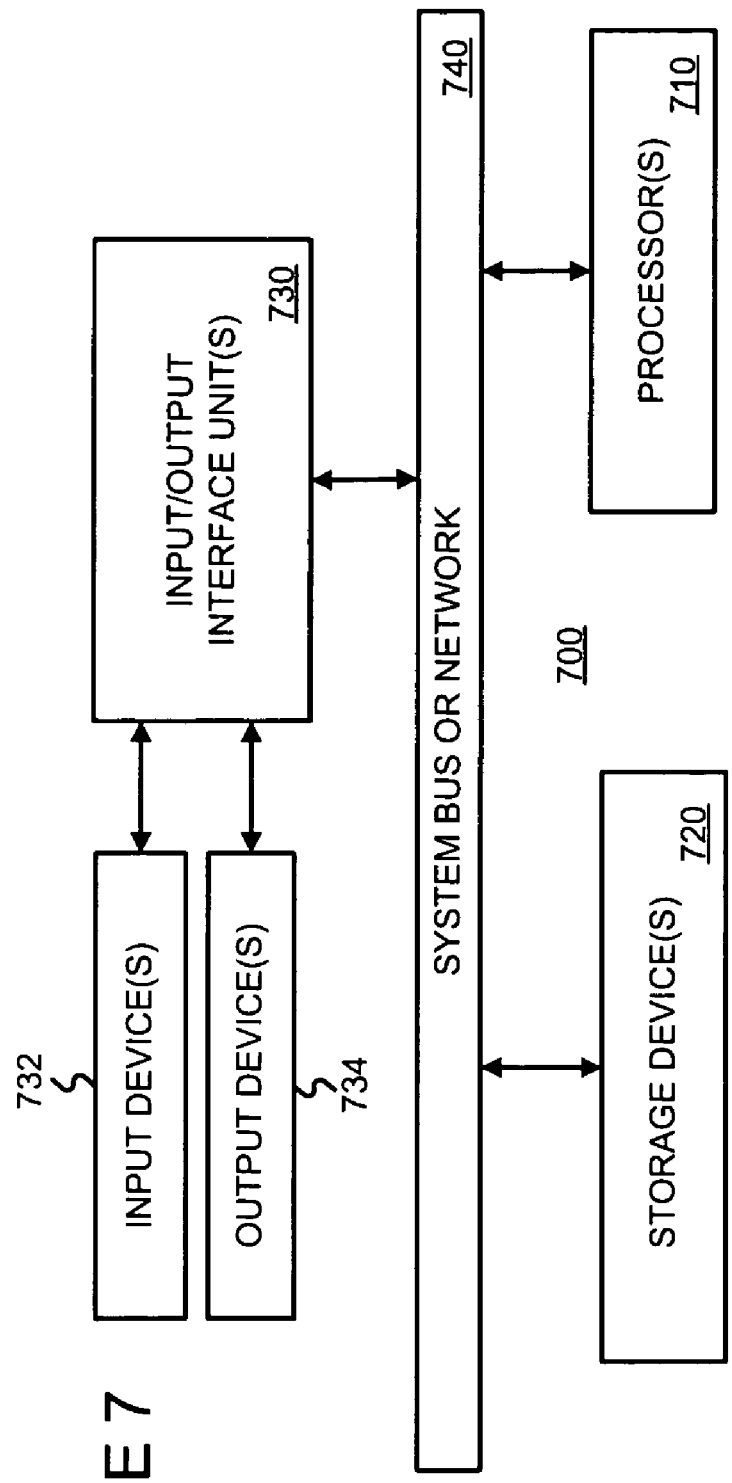
FIG. 7 is block diagram of a machine that may perform one or more operations and store information used and/or generated in a manner consistent with the present invention.

FIG. 7 is block diagram of a machine 700 that may perform one or more of the operations discussed above. The machine 700 may include one or more processors 710, one or more input/output interface units 730, one or more storage devices 720, and one or more system buses and/or networks 740 for facilitating the communication of information among the coupled elements. One or more input devices 732 and one or more output devices 734 may be coupled with the one or more input/output interfaces 730.

The one or more processors 710 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the one or more storage devices 720 and/or may be received from an external source via one or more input interface units 730.

In one embodiment, the machine 700 may be one or more conventional personal computers. In this case, the processing units 710 may be one or more microprocessors. The bus 740 may include a system bus. The storage devices 720 may include system memory, such as read only memory (ROM) and/or random access memory (RAM). The storage devices 720 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 732, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 710 through an appropriate interface 730 coupled to the system bus 740. The output devices 734 may include a monitor or other type of display device, which may also be connected to the system bus 740 via an appropriate interface. In addition to (or instead of) the monitor, the personal computer may include other (peripheral) output devices (not shown), such as speakers and printers for example.

The various operations described above may be performed by one or more machines 700, and the various information described above may be stored on one or more machines 700.

§4.3 Examples of Operations

The following illustrates an exemplary implementation consistent with the principles of the present invention in which a search server sells ad spots on search result pages as those pages are served/rendered. One or more advertisers may have specified that they want their ads to be served on a search results page served in response to a query including one or more particular keywords.

FIGS. 8*a*-8*d* illustrate examples of operations in an exemplary system consistent with the present invention. The same reference numerals as those used in FIG. 4 are used in these Figures. However, the system 400 of FIG. 4 is not limited by the operations illustrated in this section. Suppose that the Website owner is a search engine that generates search result pageviews 430 having ad spots 420 with search results to a search query.

Figure 8A:
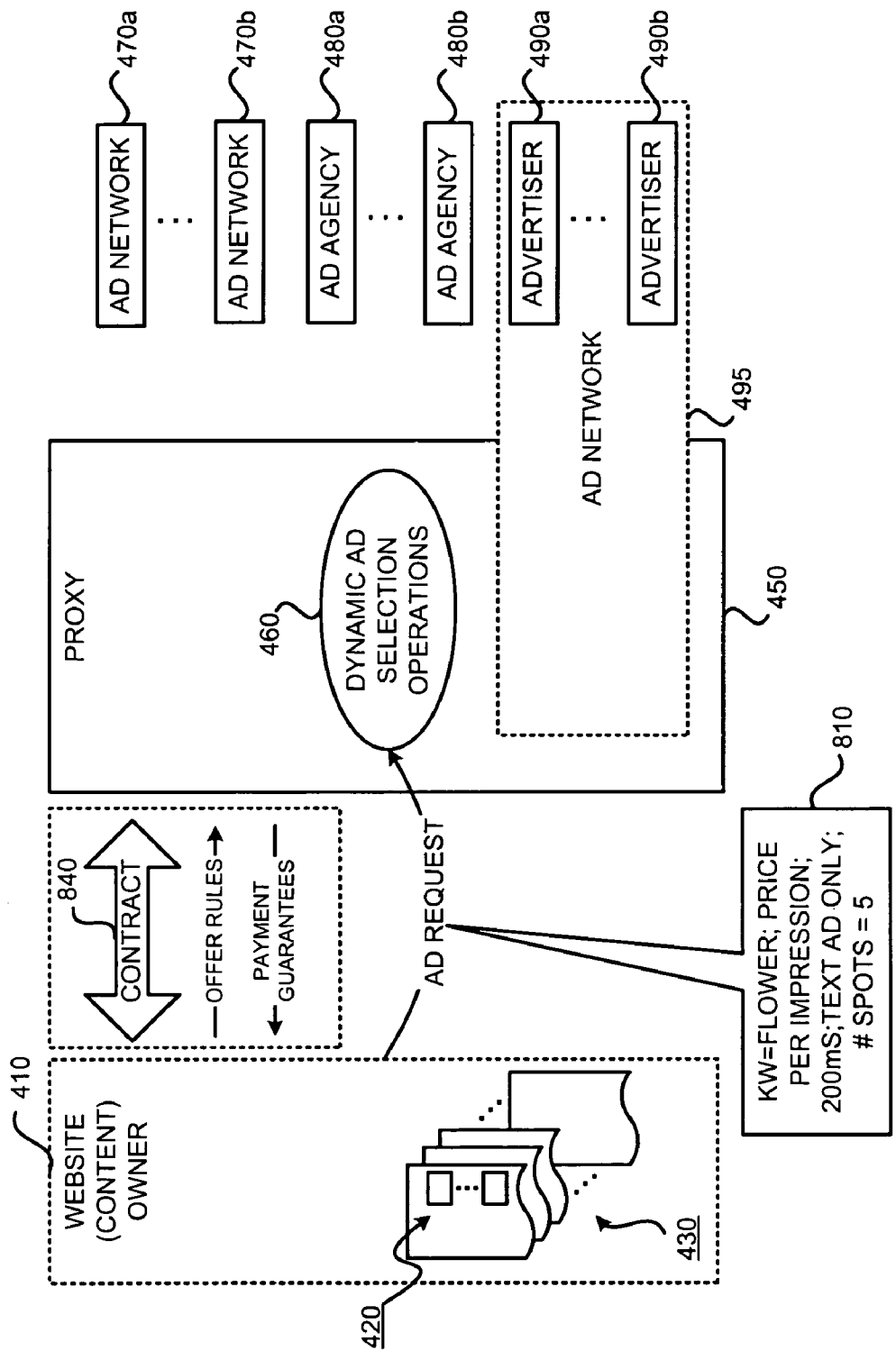
FIGS. 8a-8d illustrate examples of operations in an exemplary system consistent with the present invention.

Referring to FIG. 8A, a Website owner 410 submits an ad request 810 to the proxy 450. The dynamic ad selection operations 460 of the proxy 450 receive the ad request 810. In this example, the ad request 810 specifies that it is requesting five (5) ads and provides the keyword "flower". The ad request 810 may include the following offer rules: (i) offer open for 100-200 ms; (ii) offer should be a price in U.S. dollars per impression; and (iii) text ads only.

Figure 8B:
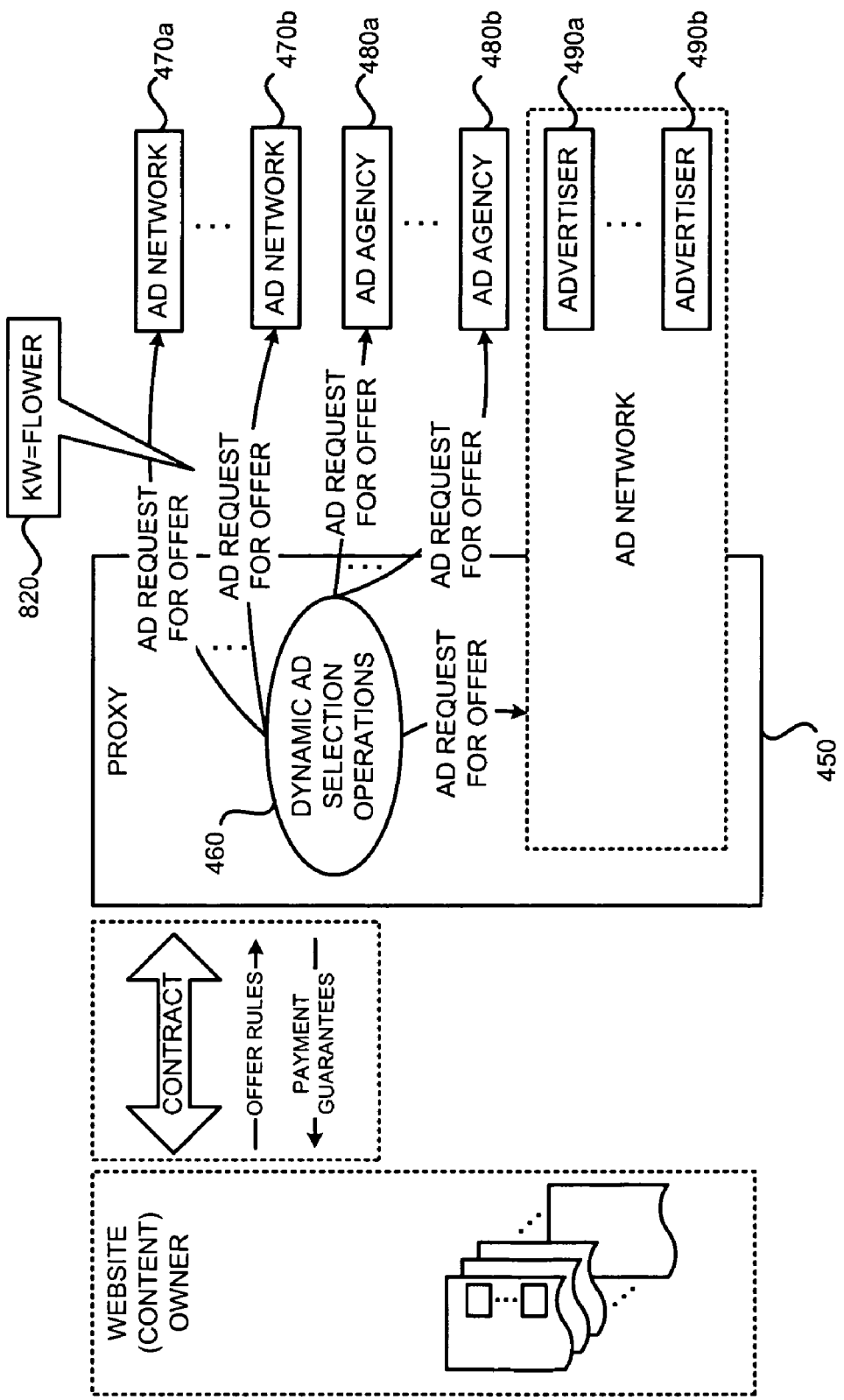

Referring to FIG. 8B, the dynamic ad selection operations 460 of the proxy 450 may then forward a number of ad requests for offers 820 to one or more ad networks 470, one or more ad agencies 480, and/or one or more advertisers 490.

The ad request for offers 820 may include at least some information from the ad request 810. In this example, the ad request for offers 820 may include the keyword=flowers.

Figure 8C:
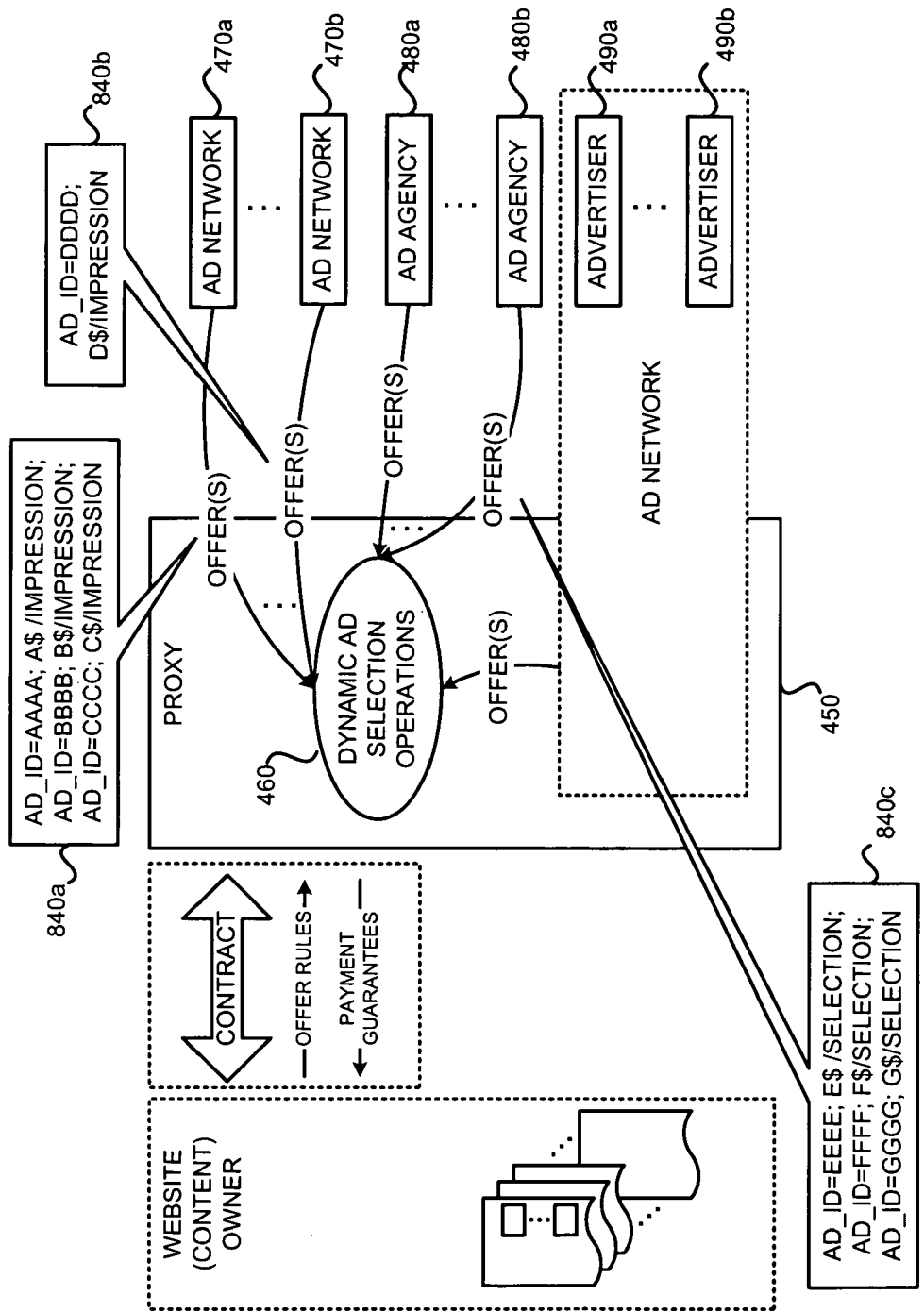

Referring to FIG. 8C, the dynamic ad selection operations 460 of the proxy 450 receive offers 840. Note that in this example, since the ad request for offers didn't specify that the offer had to be a price in U.S. dollars per impression, the offers 840 may be in different forms (e.g., price per impression, price per selection, price per conversion). In this example, the proxy 450 might want to act as a market translator and convert price per selection offers into price per impression offers by multiplying them by selection rate (e.g., selection per impression) information. Such information may have been determined based on estimates and may have used historical ad performance information. (See, e.g., U.S. Provisional Application Ser. No. 60/439,361, titled "ESTIMATING CLICK-THROUGH RATES," filed on Jan. 10, 2003 and listing Eric Veach as the inventor, and patent application Ser. No. 10/350,910, titled "ESTIMATING USER BEHAVIOR AND USING SUCH ESTIMATES," filed on Jan. 24, 2003 and listing Eric Veach as the inventor.) Similarly, the proxy 450 might convert price per conversion offers into price per impression offers by multiplying them by selection per impression and conversion per selection information.

The dynamic ad selection operations 460 then select up to five (5) ads (e.g., using some selection policy such as selecting ads with maximized revenue, selecting ads using any combination of relevance to pageview, offer price, ad performance in general, ad performance in the context of the pageview, etc.). For example, the ad selection operations 460 may select ads using offer price, offer price per selection * selection rate, offer price per impression, offer price per conversion * conversion rate, etc. Suppose in this example, that the proxy 450 used estimates, such as an estimated selection rate and an estimate conversion rate, to translate any non-compliant offers to compensation per impression values. Suppose further that the compensation per impression values were determined as follows:

| AAAA | $0.75 |
|------|-------|
| BBBB | $0.60 |
| CCCC | $0.10 |
| DDDD | $0.65 |
| EEEE | $0.70 |
| FFFF | $0.50 |
| GGGG | $0.08 |

Figure 8D:
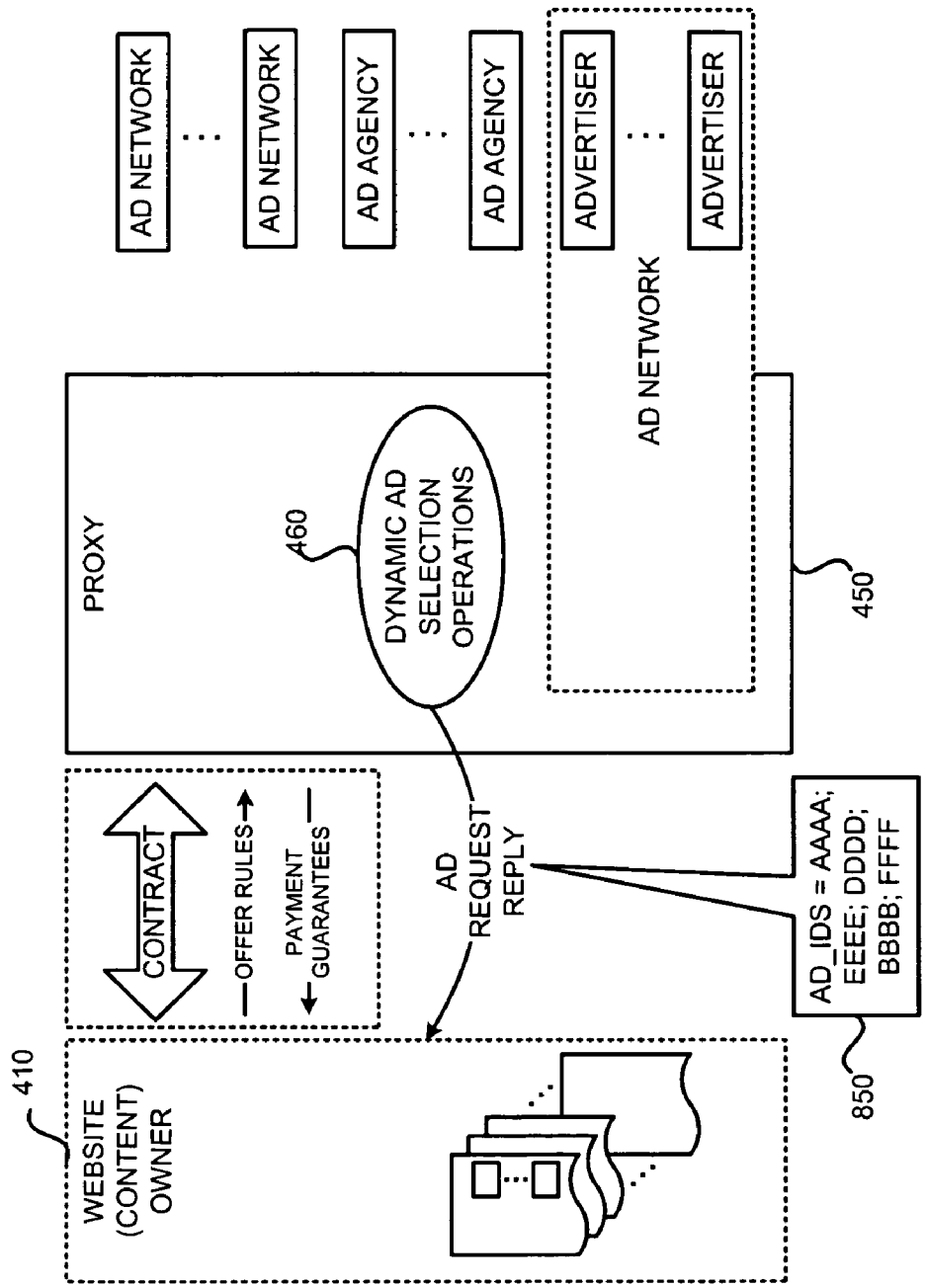

In this case, the ads AAAA, BBBB, DDDD, EEEE, FFFF may win arbitration and be selected. Further, the ads may be sorted in descending order of compensation per impression such that the order is AAAA, EEEE, DDDD, BBBB, FFFF. As shown in FIG. 8D, the proxy then provides an ad request reply 850 to the Website owner 410. The reply 850 may include the selected and ordered ads themselves, or unique ad identifiers that the Website owner can use to locate the ads.

§4.4 Conclusions

As can be appreciated from the foregoing disclosure, the present invention can be used to help Websites to get the best compensation (e.g., in terms of one or more of monetary payment, ad quality, ad relevance, ad safety, risk, etc.) for their ad spots, without requiring the Websites to run their own arbitrations or manage direct relationships with many advertisers, perhaps thousands or more. The present invention can also be used to help advertisers to get the best deals for placing their advertisements. Some embodiments of the present invention enhance advertiser competition by allowing advertisers with otherwise non-compliant offers to participate in a competitive arbitration. The present invention can be used to provide content providers with flexibility in selecting how ad spot (e.g., query) compensation is divided by ad providers using actual performance. The present invention can also be used to minimize risks to the content provider because it need not gamble on which ad provider will grow its network the fastest—it may always work with the party offering the strongest compensation. The present invention may be used to help parties avoid unacceptable contracting overhead in fragmented markets.

What is claimed is:

1. A computer-implemented method comprising:
    a) accepting, by a proxy including at least one computer, ad spot availability information for a pageview to be provided in response to a page request, the ad spot availability information accepted from a first party, wherein the first party is not the proxy;
    b) multicasting, by the proxy, ad spot requests for offers using the accepted ad spot availability information to at least two second parties, wherein the at least two second parties include at least two ad networks that are different from the first party and the proxy;
    c) receiving, by the proxy, offers;
    d) determining, by the proxy, at least one winning ad using the offers; and
    e) providing, by the proxy, information concerning at least one of the at least one winning ad to the first party.

2. The computer-implemented method of claim 1, further comprising:
    f) recording, by the proxy, first party payment information.

3. The computer-implemented method of claim 2, wherein the first party is a Website owner.

4. The computer-implemented method of claim 2, further comprising:
    g) paying, by the proxy, the first party using the first party payment information.

5. The computer-implemented method of claim 2, further comprising:
    g) paying, by the proxy, the first party using the first party payment information and a previously agreed upon guarantee.

6. The computer-implemented method of claim 2, further comprising:
    g) paying, by the proxy, the first party using the first party payment information and a previously agreed upon guarantee, wherein the previously agreed upon guarantee includes a profit percentage.

7. The computer-implemented method of claim 1, further comprising:
    f) recording, by the proxy, second party billing information.

8. The computer-implemented method of claim 1, wherein the act of multicasting ad spot requests for offers includes sending an ad Spot request for offer to at least two of (i) a first ad network, (ii) a second ad network, (iii) a first ad agency, and (iv) a second ad agency.

9. The computer-implemented method of claim 1, wherein the ad spot availability information includes offer rules.

10. The computer-implemented method of claim 9, wherein at least some of the ad spot requests for offers include at least some of the offer rules.

11. The computer-implemented method of claim 9, wherein the ad spot requests for offers include none of the offer rules.

12. The computer-implemented method of claim 9, wherein the act of determining at least one winning ad enforces strict offer rule compliance.

13. The computer-implemented method of claim 9, wherein the act of determining at least one winning ad converts an offer that is not in compliance with an offer rule to a converted offer that is compliant with the offer rule.

14. The computer-implemented method of claim 13, wherein the act of determining at least one winning ad that converts the offer uses estimated ad performance information.

15. The computer-implemented method of claim 13, wherein the act of determining at least one winning ad that converts the offer uses estimated ad selection rate information.

16. The computer-implemented method of claim 13, wherein the act of determining at least one winning ad that converts the offer uses estimated ad conversion rate information.

17. A computer-implemented method comprising:
 a) sending, by a content provider including at least one computer, ad spot availability information for a pageview to be provided in response to a page request, to a proxy representing at least two of (i) a first ad network, (ii) a second ad network, (iii) a first ad agency, and (iv) a second ad agency, wherein the content provider is not the proxy;
 b) receiving, by the content provider, information concerning at least one ad corresponding to the ad spot availability information from the proxy, wherein the information concerning the at least one ad originates from an advertiser, and wherein the advertiser is different from the proxy and the content provider;
 c) serving, by the content provider, the at least one ad corresponding to the ad spot availability information on an ad spot; and
 d) receiving, by the content provider, payment related to the act of serving the at least one ad corresponding to the ad spot availability information on the ad spot.

18. The computer-implemented method of claim 17, wherein the payment is determined using a previously agreed upon guarantee from the proxy.

19. The computer-implemented method of claim 18, wherein the previously agreed upon guarantee includes a profit percentage.

20. The computer-implemented method of claim 17, wherein the ad spot availability information includes offer rules.

21. A computer-implemented method comprising:
 a) accepting, by a proxy including at least one computer, ad availability information from an advertiser, wherein the ad availability information is associated with an ad to be served, and wherein the advertiser is not the proxy;
 b) multicasting, by the proxy, requests for offers using the accepted ad availability information associated with the ad to be served to at least two content owners, wherein the at least two content owners are different from the advertiser and the proxy;
 c) receiving, by the proxy, offers to place an ad of the advertiser on at least one ad spot of at least one pageview of each of the at least two content owners;
 d) determining, by the proxy, at least one winning ad spot using the offers; and
 e) providing, by the proxy, information concerning at least one of the at least one winning ad spot to the advertiser.

22. The computer-implemented method of claim 21, further comprising:
 f) recording, by the proxy, advertiser billing information associated with the ad availability information.

23. The computer-implemented method of claim 22, further comprising:
 g) billing, by the proxy, the advertiser associated with the ad availability information using the advertiser billing information.

24. The computer-implemented method of claim 22, further comprising:
 g) billing, by the proxy, the advertiser associated with the ad availability information using the advertiser billing information and a previously agreed upon guarantee.

25. The computer-implemented method of claim 22, further comprising:
 g) billing, by the proxy, the advertiser associated with the ad availability information using the advertiser billing information and a previously agreed upon guarantee, wherein the previously agreed upon guarantee includes a cost percentage.

26. The computer-implemented method of claim 21, wherein the ad availability information includes offer rules required by the advertiser associated with the ad availability information.

27. The computer-implemented method of claim 26, wherein at least some of the requests for offers include at least some of the offer rules.

28. The computer-implemented method of claim 26, wherein the requests for offers include none of the offer rules.

29. The computer-implemented method of claim 26, wherein the act of determining at least one winning ad spot enforces strict offer rule compliance.

30. The computer-implemented method of claim 26, wherein the act of determining at least one winning ad spot converts an offer that is not in compliance with an offer rule to a converted offer that is compliant with the offer rule.

31. The computer-implemented method of claim 30, wherein the act of converting uses estimated ad performance information.

32. The computer-implemented method of claim 30, wherein the act of converting uses estimated ad selection rate information.

33. The computer-implemented method of claim 30, wherein the act converting uses estimated ad conversion rate information.

34. Apparatus comprising:
 a) at least one processor;
 b) an input device; and
 c) at least one storage device storing a computer executable code which, when executed by the at least one processor, performs a method of
  1) accepting, by a proxy, ad spot availability information for a pageview to be provided in response to a page request, the ad spot availability information accepted from a first party, wherein the first party is not the proxy,
  2) multicasting, by the proxy, ad spot requests for offers using the accepted ad spot availability information to at least two second parties, wherein the at least two second parties include at least two ad networks that are different from the first party and the proxy,
  3) receiving, by the proxy, offers,
  4) determining, by the proxy, at least one winning ad using the offers, and 5) providing, by the proxy, information concerning at least one of the at least one winning ad to the first party.

35. The apparatus of claim 34 further comprising:
6) recording, by the proxy, first party payment information.

36. The apparatus of claim 35, wherein the first party is a Website owner.

37. The apparatus of claim 35, further comprising:
7) paying, by the proxy, the first party using the first party payment information.

38. The apparatus of claim 35, further comprising:
7) paying, by the proxy, the first party using the first party payment information and a previously agreed upon guarantee.

39. The apparatus of claim 35, further comprising:
7) paying, by the proxy, the first party using the first party payment information and a previously agreed upon guarantee, wherein the previously agreed upon guarantee includes a profit percentage.

40. The apparatus of claim 34, further comprising:
6) recording, by the proxy, second party billing information.

41. The apparatus of claim 34, wherein the act of multicasting ad spot requests for offers includes sending an ad spot request for offer to at least two of (i) a first ad network, (ii) a second ad network, (iii) a first ad agency, and (iv) a second ad agency.

42. The apparatus of claim 34, wherein the ad spot availability information includes offer rules.

43. The apparatus of claim 42, wherein at least some of the ad spot requests for offers include at least some of the offer rules.

44. The apparatus of claim 42, wherein the ad spot requests for offers include none of the offer rules.

45. The apparatus of claim 42, wherein the act of determining at least one winning ad enforces strict offer rule compliance.

46. The apparatus of claim 42, wherein the act of determining at least one winning ad converts an offer that is not in compliance with an offer rule to a converted offer that is compliant with the offer rule.

47. The apparatus of claim 46, wherein the act of converting uses estimated ad performance information.

48. The apparatus of claim 46, wherein the act of converting uses estimated ad selection rate information.

49. The apparatus of claim 46, wherein the act of converting uses estimated ad conversion rate information.

50. Apparatus comprising:
a) at least one processor;
b) an input device; and
c) at least one storage device storing a computer executable code which, when executed by the at least one processor, performs a method of
1) sending, by a content provider, ad spot availability information for a pageview to be provided in response to a page request, to a proxy representing at least two of (i) a first ad network, (ii) a second ad network, (iii) a first ad agency, and (iv) a second ad agency, wherein the content provider is not the proxy,
2) receiving, by the content provider, information concerning at least one ad corresponding to the ad spot availability information from the proxy, wherein the information concerning the at least one ad originates from an advertiser, and wherein the advertiser is different from the proxy and the content provider,
3) serving the at least one ad corresponding to the ad spot availability information on an ad spot, and
4) receiving payment related to the act of serving the at least one ad corresponding to the ad spot availability information on the ad spot.

51. The apparatus of claim 50, wherein the payment is determined using a previously agreed upon guarantee from the proxy.

52. The apparatus of claim 51, wherein the previously agreed upon guarantee includes a profit percentage.

53. The apparatus of claim 50, wherein the ad spot availability information includes offer rules.

54. Apparatus comprising:
a) at least one processor;
b) an input device; and
c) at least one storage device storing a computer executable code which, when executed by the at least one processor, performs a method of
1) accepting by a proxy, ad availability information from an advertiser, wherein the ad availability information is associated with an ad to be served, and wherein the advertiser is not the proxy,
2) multicasting, by the proxy, requests for offers using the accepted ad availability information associated with the ad to be served to at least two content owners, wherein the at least two content owners are different from the advertiser and the proxy,
3) receiving, by the proxy, offers to place an ad of the advertiser on at least one ad spot of at least one pageview of each of the at least two content owners,
4) determining, by the proxy, at least one winning ad spot using the offers, and
5) providing, by the proxy, information concerning at least one of the at least one winning ad spot to the advertiser.

55. The apparatus of claim 54, further comprising:
6) recording, by the proxy, advertiser billing information associated with the ad availability information.

56. The apparatus of claim 55, further comprising:
7) billing, by the proxy, the advertiser associated with the ad availability information using the advertiser billing information.

57. The apparatus of claim 55, further comprising:
7) billing, by the proxy, the advertiser associated with the ad availability information using the advertiser billing information and a previously agreed upon guarantee.

58. The apparatus of claim 55, further comprising:
7) billing, by the proxy, the advertiser associated with the ad availability information using the advertiser billing information and a previously agreed upon guarantee, wherein the previously agreed upon guarantee includes a cost percentage.

59. The apparatus of claim 54, wherein the ad availability information includes offer rules required by the advertiser associated with the ad availability information.

60. The apparatus of claim 59, wherein at least some of the requests for offers include at least some of the offer rules.

61. The apparatus of claim 59, wherein the requests for offers include none of the offer rules.

62. The apparatus of claim 59, wherein the act of determining at least one winning ad spot enforces strict offer rule compliance.

63. The apparatus of claim 59, wherein the act of determining at least one winning ad spot converts an offer that is not in compliance with an offer rule to a converted offer that is compliant with the offer rule.

64. The apparatus of claim 63, wherein the act of converting uses estimated ad performance information.

65. The apparatus of claim 63, wherein the act of converting uses estimated ad selection rate information.

66. The apparatus of claim 63, wherein the act of converting uses estimated ad conversion rate information.

* * * * *